(12) United States Patent
Sälzle

(10) Patent No.: US 6,923,471 B2
(45) Date of Patent: Aug. 2, 2005

(54) SIDE GAS BAG MODULE FOR A VEHICLE OCCUPANT PROTECTION SYSTEM

(75) Inventor: Günther Sälzle, Aspach (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 88 days.

(21) Appl. No.: 10/290,822

(22) Filed: Nov. 8, 2002

(65) Prior Publication Data

US 2003/0090092 A1 May 15, 2003

(30) Foreign Application Priority Data

Nov. 14, 2001 (DE) .................................... 201 18 457 U

(51) Int. Cl.⁷ .............................................. B60R 21/20
(52) U.S. Cl. .................................. 280/728.2; 280/730.2
(58) Field of Search .......................... 280/730.2, 728.2, 280/728.3, 730.1

(56) References Cited

U.S. PATENT DOCUMENTS

| | | | | |
|---|---|---|---|---|
| 5,342,083 A | * | 8/1994 | Gentile et al. ........... | 280/728.2 |
| 6,199,896 B1 | | 3/2001 | Brucker | |
| 6,209,907 B1 | * | 4/2001 | Fischer ..................... | 280/730.2 |
| 6,364,349 B1 | * | 4/2002 | Kutchey et al. .......... | 280/730.2 |
| 6,481,744 B2 | * | 11/2002 | Melia ....................... | 280/730.2 |
| 6,517,102 B2 | * | 2/2003 | Kolb ........................ | 280/730.2 |
| 6,626,456 B2 | * | 9/2003 | Terbu et al. .............. | 280/730.2 |

FOREIGN PATENT DOCUMENTS

| | | | |
|---|---|---|---|
| DE | 29807098 | 9/1998 | |
| EP | 0957010 | 11/1999 | |
| EP | 1055566 | 11/2000 | |
| EP | 1055566 A2 * | 11/2000 | ........... B60R/21/20 |
| JP | 08072657 A * | 3/1996 | ........... B60R/21/20 |

* cited by examiner

Primary Examiner—Peter C. English
(74) Attorney, Agent, or Firm—Tarolli, Sundheim, Covell & Tummino L.L.P.

(57) ABSTRACT

A side gas bag module for a vehicle occupant protection system comprises an elongated housing that has first and second side pieces which are joined by means of a back and have edges as well as inner faces lying opposite each other. The module further comprises a gas bag arranged folded in the housing as well as at least one flap provided on the edge of the first side piece remote from the back, which flap is pivotally connected via a hinge with the first side piece. At least a major part of the flap, before an activation of the gas bag module, is arranged inside the housing and adjoins the inner face of the second side piece.

15 Claims, 3 Drawing Sheets

SIDE GAS BAG MODULE FOR A VEHICLE OCCUPANT PROTECTION SYSTEM

TECHNICAL FIELD

The invention relates to a side gas bag module for a vehicle occupant protection system.

BACKGROUND OF THE INVENTION

Conventional side gas bag modules comprise an elongated housing that has first and second side pieces which are connected by means of a spine portion and have edges as well as inner faces lying opposite each other, a gas bag arranged folded in the housing and at least one flap provided on the edge of the first side piece remote from the spine portion, which flap is pivotally connected via a hinge with the first side piece.

Such side gas bag modules are used to accommodate side gas bags which have a large area, which extend for example from the A- to the C-column of a vehicle. The side pieces of the housing define here a so-called ejection channel, through which the gas bag emerges on activation of the module during unfolding.

The opening of the ejection channel, which is defined by the edges of the side pieces a distance remote from the spine portion, is closed hitherto for example by latching connectors arranged at intervals. These latching connectors are forced open by the unfolding gas bag on activation of the gas bag module and then free the opening of the ejection channel.

Modern side gas bags have several inflatable chambers which are separated from each other by non-inflatable areas, in order to be able to keep the quantity of required inflation gas low and to optimize the restraint characteristics of the gas bag. The non-inflatable areas of the gas bag generally run over far distances parallel to the unfolding direction of the gas bag. For the unfolding of the gas bag from the housing, this means that during the initial phase of unfolding, in which the gas bag is still arranged in the housing, the non-inflatable regions can exert no or only a little force onto the latching connectors which close the housing. Therefore, in these regions, a greater spacing of the latching connectors is selected for closing the opening of the ejection channel. A similar situation applies with the presence of an A-column chamber, which only has a small volume. When being filled with gas, such a chamber can likewise only exert a small force onto the housing. Conventional gas bag module housings remain in this region either unclosed or are only closed by a few latching connectors. Between the latching connectors, the housing is often only closed by an overlapping of the walls of the side pieces. Through costly measures, it must be ensured that the gas bag does not work itself out from the housing at these points in the course of time, owing to vibrations of the vehicle.

From EP 1 055 566 A2 there is known a generic side gas bag restraint system, in which the first side wall is approximately twice as wide as the second side wall. An over-wide flap is formed on the first side wall, which supplements the second side wall and is fastened to it by means of a latching nose having a small width. The second side wall is of such a small width that the folded gas bag almost does not adjoin it at all. Rather, the first side wall is formed with its flap into a "U", in which the folded gas bag is housed. However, in case the gas bag applies a pressure onto the flap, then the danger exists that the latching nose slides along the free edge of the second side piece, a distance remote from the spine portion of the housing, and the housing opens at least in parts. A further disadvantage of the known housing consists in that the unfolding direction is not predetermined by the housing itself, i.e. no ejection channel is provided, i.e. a channel between the two side walls in which the gas bag is moved on unfolding.

It is an object of the invention to present a side gas bag module in which the ejection channel opening can be closed completely and securely in a simple and favorably-priced manner.

BRIEF SUMMARY OF THE INVENTION

According to the invention, a side gas bag module for a vehicle occupant protection system comprises an elongated housing that has first and second side pieces which are joined by means of a spine portion and have edges as well as inner faces lying opposite each other. The module further comprises a gas bag arranged folded in the housing as well as at least one flap provided on an edge of the first side piece remote from the spine portion which flap is pivotally connected via a hinge with the first side piece. At least a major part of the flap, before an activation of the gas bag module, is arranged inside the housing and adjoins the inner face of the second side piece. With one or more such flaps, the secure closing of the outlet opening of the housing of the side gas bag module is possible. The gas bag can thus be enclosed so as to be secure from damage and dust-tight. In addition, the gas bag can not work itself out from the housing, because the flap is arranged inside the housing and thus, with a light pressure by the gas bag, counteracts the movement of the gas bag, by the frictional force between the flap and the second side piece and the stability of the housing being increased. The stability is increased by the flap and the second side piece lying adjacent to each other in the manner of a composite part.

This self-securing effect is further increased when the flap lies against the inner face of the second side piece under tension. It is favorable if the gas bag lies in folded state against the flap and presses against it.

Preferably, the flap is connected with the first side piece by means of a film hinge. In this case, the entire housing can be produced in one piece in a simple manner by injection molding. However, it is also possible to pivotally fasten the flap to the first side piece by other known methods. The housing can also be composed of several different pieces. In this case, it may be favorable if the flap and the first side piece consist of different materials, in order to be able to adapt the flap and side piece optimally to their respective tasks.

In a preferred embodiment of the invention, with an activation of the gas bag module, the flap is moved out from the interior of the housing and remains connected with the first side piece. An endangering of an occupant by the flap is therefore ruled out. The housing is advantageously designed to be so elastic that on an activation of the gas bag module, in which compressed gas is introduced into the gas bag, the two side pieces are pressed apart by the expanding gas bag. In so doing, the flap slides out from the interior of the housing and frees the opening of the ejection channel. The gas bag can unfold practically without resistance. In this situation, the opening of the flap is supported by the pressure of the gas bag. The ejection channel opening is completely freed, so that there is no hindrance to the gas bag during its unfolding.

The flap can in addition be arranged such that with an activated gas bag module it covers a projecting vehicle contour. This assists the gas bag on its unfolding over any protruding vehicle contours such as, for example, the head of a B-column, and ensures a rapid and reliable unfolding.

In addition, the flap can be arranged such that with an activated gas bag module it co-determines the unfolding direction of the gas bag. Thus, in a simple manner, a favorable unfolding direction can be predetermined. The dimensions and number of flaps are preferably coordinated with the respective purpose of use and the respective vehicle geometry.

Depending on the vehicle geometry and the desired unfolding direction of the gas bag, the first side piece with the flap can either be arranged directed to a vehicle side wall or to the interior of the vehicle. When the flap is to be used to co-determine the unfolding direction, the flap is advantageously arranged such that it lies at least partially in the region of active chambers of the gas bag, i.e. of sections of the gas bag which are filled on unfolding of the gas bag or in the unfolded state of the gas bag.

Preferably, the distance between the edges of the first and second side piece is smaller than the distance of the two side pieces close to the spine portion. In simple terms the geometry of the housing is selected such that the side pieces run towards each other in the region of the opening of the ejection channel. Through this constriction of the ejection channel, the flap arranged in the interior of the housing finds a good hold against the inner face of the second side piece. In addition, such a constriction can likewise contribute to the co-determining of the unfolding direction of the gas bag.

In an advantageous embodiment of the invention, at least one latching connector is provided on the edges of the side pieces remote from the spine portion, via which the side pieces can be fastened to each other.

In particular in the connection with such latching connectors, it is favorable if the flap does not extend across the entire length which the housing has, viewed along the spine portion. Preferably, several flaps are provided, arranged adjacent to each other on the edge of the first side piece, viewed along the spine portion. It is particularly advantageous if the latching connectors are arranged between adjacent flaps. The use of several flaps also facilitates an adaptation of the housing to the contour of the roof frame.

The flaps can be arranged along the edge of the first side piece such that they lie in non-inflatable regions of the gas bag. In this configuration, the opening of the ejection channel is reliably closed by latching connectors, whereas the regions lying between the latching connectors are closed by the flaps in a dust-tight manner. Through the flaps, the gas bag is in addition effectively prevented from working itself out from the housing. As the flaps free the ejection channel opening with a small action of force by the gas bag, when the housing is widened in adjacent regions by the unfolding gas bag, the gas bag can unfold, almost without resistance, in the region of its non-inflatable regions.

The closing of the housing can be facilitated in that the first side piece has a closure section which closes an outlet opening for the gas bag on the housing opposite the spine portion, and to which the flap is pivotally connected. The swivel axis of the flap, in this context, preferably adjoins the edge of the second side piece remote from the spine portion. This means that the entire flap extends inside the housing. The provision of the closure section which is connected with the remainder of the side piece by means of a film hinge, and the arranging of the flap on the closure section, again by means of a film hinge, permits a non-forceful opening when a force, acting parallel to the side pieces, acts on the closure section. This force is exerted by the unfolding gas bag and preferably acts perpendicularly onto the closure section. The closure section can be provided along the entire edge of the side piece, remote from the spine portion, or only provided in the region of the flaps.

DETAILED DESCRIPTION OF THE PREFERRED EMBODIMENT

Figure 1:
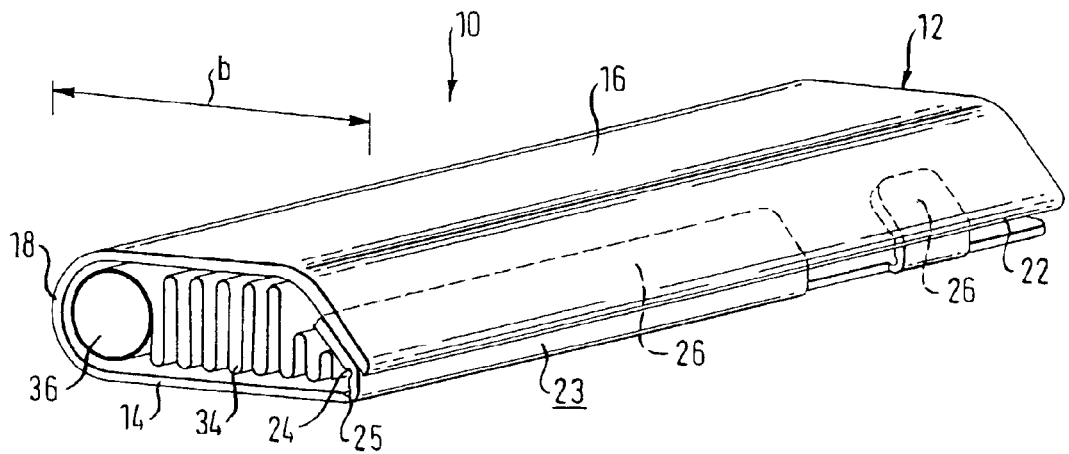
FIG. 1 shows a diagrammatic perspective view of a side gas bag module according to the invention in the closed state.
Figure 2:
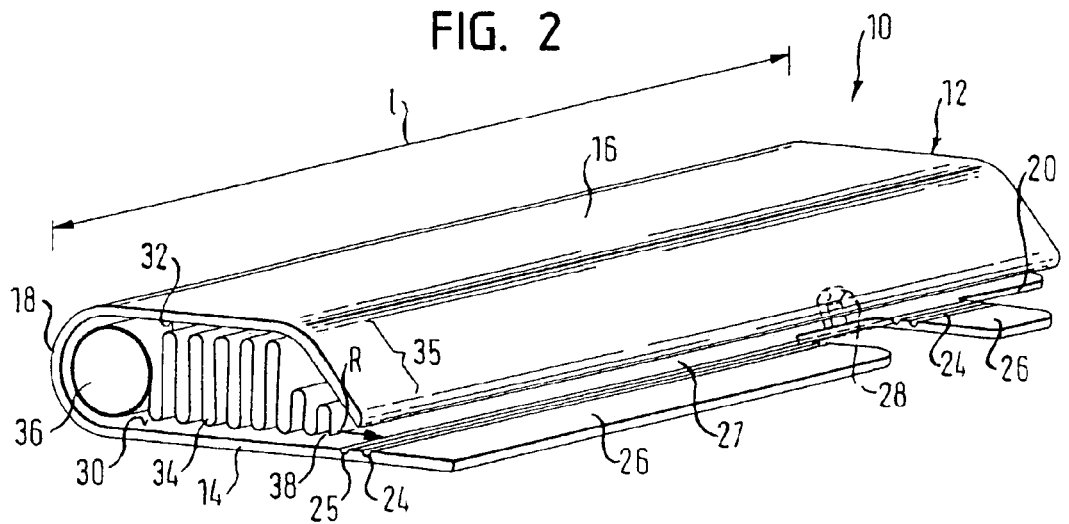
FIG. 2 shows the side gas bag module of FIG. 1 before the closing of the flap.

The side gas bag module 10 shown in FIGS. 1 and 2 has a housing 12 which consists substantially of a first side piece 14, a second side piece 16 and a spine portion 18 connecting the first and second side pieces. The housing has an elongated shape and, along the spine portion 18, the length 1.

Whereas the first side piece 14 runs substantially in a straight line from the spine portion 18 to its lower edge remote from the spine portion, the second side piece 16 has a curve in the direction towards its distant free edge 22. This shape brings it about that the distance between the lower edges 20 and 22 of the two side pieces 14 and 16 is distinctly smaller than the distance of the two side pieces 14, 16 close to the spine portion 18. The overall width b of the side pieces 14, 16 in the plane of the side piece 14 is approximately identical.

The side piece 14 has formed on a closure section 23, which is connected via a film hinge 25 with the remainder of the side piece 14. The closure section 23 closes the outlet opening 27 for the gas bag, illustrated in FIG. 2, the outlet opening 27 still being illustrated too narrow in FIG. 2, because on unfolding of the gas bag, the housing is widened. The closure section 23 bridges the distance between the film hinge 25 and the free edge 22 of the second side piece 16 and closes the housing, at least in part. Several flaps 26 are pivotally arranged by means of film hinges 24 on the closure section 23 which belongs to the side piece 14. The flaps 26 are substantially rigid. As can be seen from FIG. 1, the film hinge 24 immediately adjoins the free edge 22, so that not only a majority of the flaps 26, i.e. more than 50% of the flap width, but the flaps 26 over their entire width lie inside the housing 12. The closure section 23 can extend across the entire length 1 (as illustrated in FIG. 2 by broken lines); however, it may also only be provided in the region of the flaps 26 (as illustrated in FIG. 1).

The flaps 26 do not extend across the entire length 1. Between the flaps 26, one or more latching connectors 28 are provided, via which the lower edges 20, 22 of the side pieces 14, 16 can be fastened to each other.

In the interior of the housing, which is defined here by the region lying between the inner faces 30, 32 of the side pieces 14, 16, a folded gas bag 34 is arranged. The gas bag 34 can be connected for example by means of a gas duct 36 with a source of compressed gas, indicated in FIG. 5.

The side gas bag module 10 is constructed by the housing 12, which has a certain elasticity owing to the geometry of the side pieces 14, 16 connected with each other via the spine portion 18, being bent apart and the gas bag 34 with the gas duct 36 being placed into the housing. Then the closure section 23 and the flaps 26 are swiveled around the film hinges 24, 25 and the flaps 26 are arranged inside the housing 12 such that they lie over a large area against the inner face 32 of the second side piece 16. The flaps 26 press against the inner face 32 of the side piece 16, so that they can not slip out from the inside of the housing through movements of the vehicle. Preferably, a portion of the folded gas bag 34 lies directly against the flaps 26 and presses these against the side piece 16, which contributes to keeping the flaps closed before the activation of the gas bag module. With a closed housing, as is illustrated in FIG. 1, the flaps 26 prevent the gas bag 34 from working out from the housing 12. The fixing in position of the flaps 26 in the closed state of the housing is improved and the sliding out of the flaps 26 from the housing 12 is reliably prevented in that the flaps 26 lie against a region 35 of the second side piece 16, which does not run parallel to the first side piece 14, but rather is angled running obliquely towards it.

On closing of the housing 12, in addition the latching connectors 28 are closed, so that the outlet opening of the ejection channel 38 of the housing 12 is closed, which opening is defined by the lower edges 20, 22 of the side pieces 14, 16.

Figure 5:
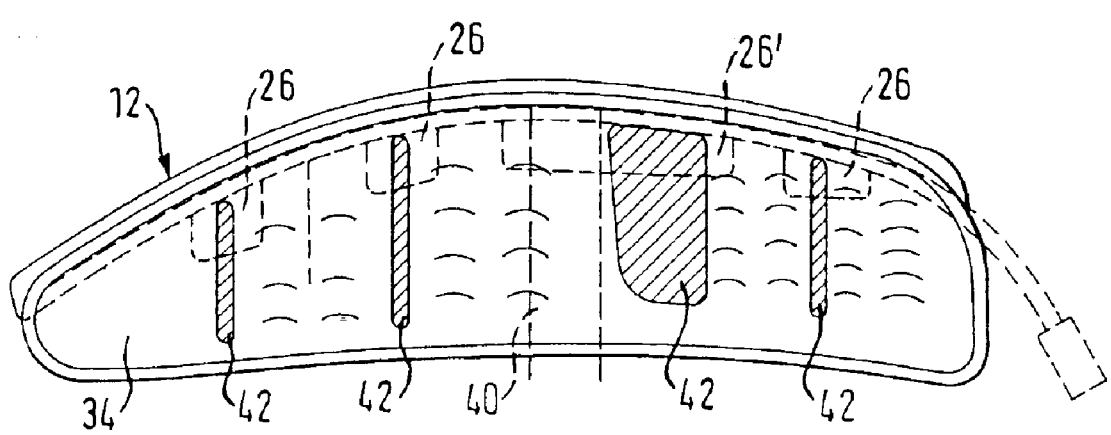
FIG. 5 shows a diagrammatic view of a side gas bag module according to the invention, with unfolded gas bag.

The latching connectors 28 are preferably arranged in the region of inflatable chambers of the gas bag 34, whereas at least some of the flaps 26 are arranged such that they correspond with non-inflatable regions 42 (FIG. 5). In the example shown in FIG. 5, a flap 26' is provided, which is associated both with a non-inflatable region 42 and also, in the region of a vehicle contour 40 (here, the B-column), with a section of an inflatable region.

On activation of the side gas bag module 10, compressed gas flows via the gas duct 36 into the folded gas bag 34. The inflatable chambers of the gas bag 34 begin to expand and in so doing press the inner faces 30, 32 of the housing 12 slightly apart in their surrounding area. Hereby, the latching connectors 28 are rapidly and securely released. In the area surrounding the non-inflatable regions 42, the gas bag 34 can, with the initial unfolding, only exert slight lateral forces onto the side pieces 14, 16. As the opening of the flaps 26, 26', however, only requires a distinctly smaller force than the releasing of the latching connectors 28, this force is sufficient to allow the flaps 26, 26' to slide easily out from the interior of the housing and in so doing to swivel the closure section 23. In addition, the movement of the flaps is supported by the widening of the housing 12 in the area surrounding the inflatable chambers and by the unfolding gas bag 34. Viewed as a whole, the emerging of the gas bag 34 from the housing 12 can thus take place simultaneously across the entire length l of the housing.

The flaps 26, 26' remain connected via the film hinges 24 with the first side piece 14 of the housing 12. When the flaps 26, 26' have slid entirely cut from the interior of the housing, a portion of the flap 26' will lay, in the example shown in FIGS. 3 and 5, over projecting vehicle contours 40 (here, the B-column) and thus assists the gas bag 34 on its unfolding to rapidly and reliably overcome these vehicle contours 40. The same or other flaps 26, 26' can at the same time co-determine the unfolding direction R of the gas bag 34, in order to bring it into an optimum unfolding position. The unfolding direction R is therefore co-determined by the flaps 26, 26', because the gas bag 34 is in contact with the outwardly swiveled flaps 26 after the emergence of the gas bag 34 from the housing 12.

Figure 3:
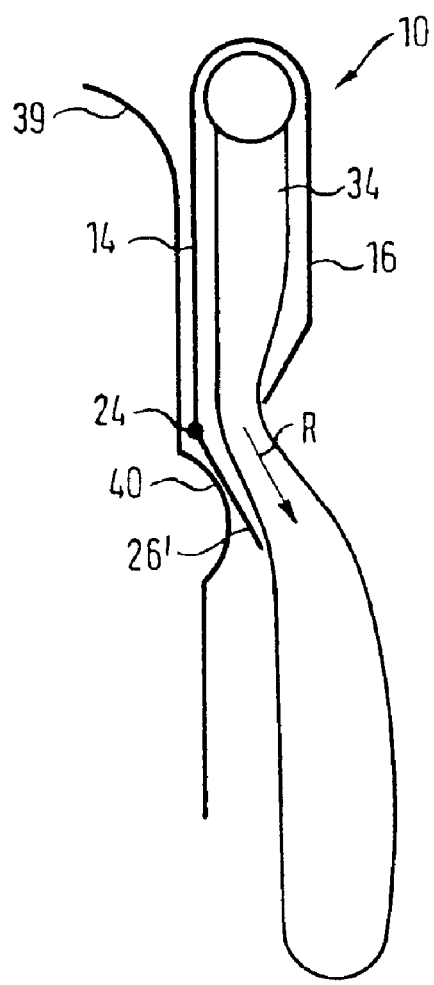
FIG. 3 shows a diagrammatic section through a side gas bag module according to the invention, during the unfolding of the gas bag.

FIG. 3, which shows the gas bag module 10 during the unfolding of the gas bag 34, demonstrates this. The flaps 26, 26' are open, one of the flaps 26' covering a projecting vehicle contour 40, e.g. the head of a B-column, and at the same time influencing the unfolding direction R of the gas bag 34 such that the gas bag 34 rapidly and securely is guided past the vehicle contour 40.

In the embodiment illustrated in FIG. 3, the gas bag module 10 is designed such that the first side piece 14 is directed to a vehicle side wall 39, when the side gas bag module 10 is fastened to the vehicle.

Figure 4:
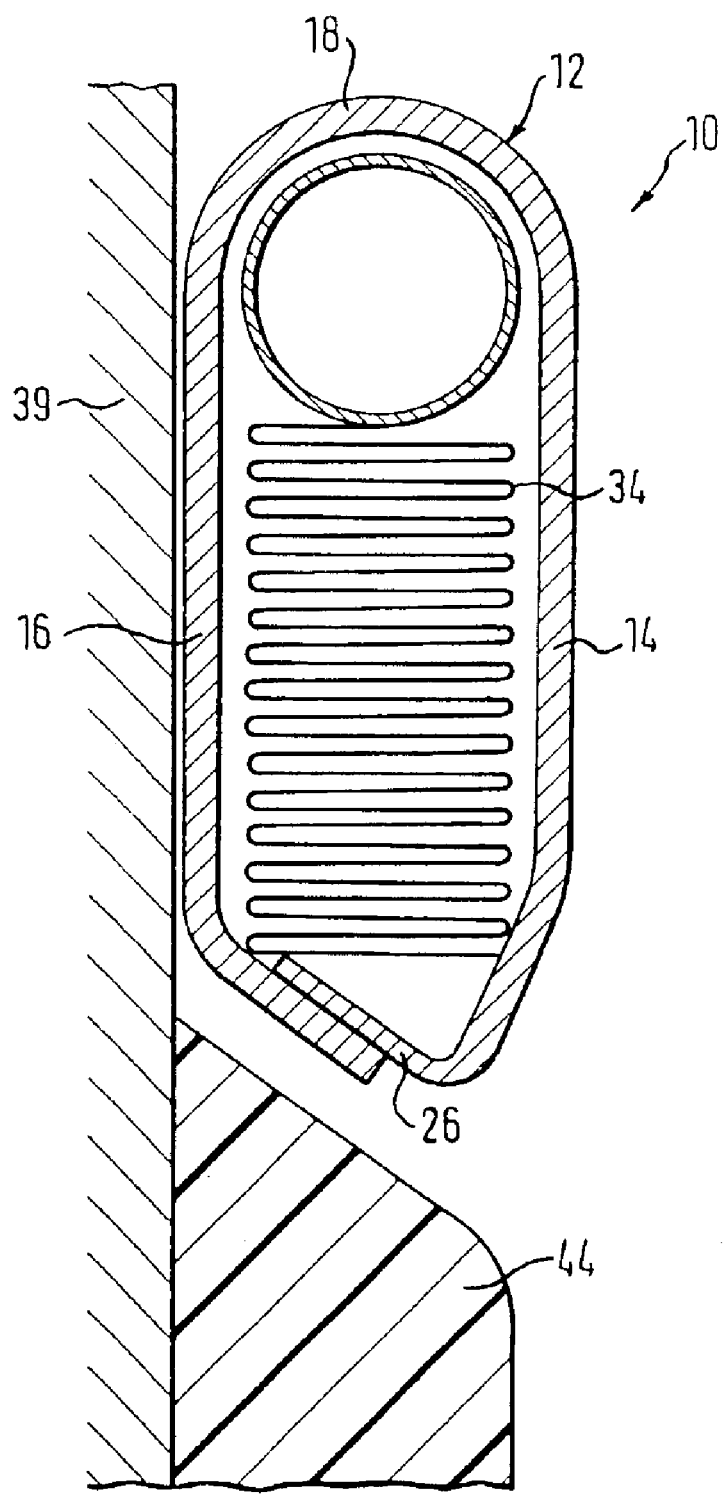
FIG. 4 shows a diagrammatic section through a vehicle side with a side gas bag module according to the invention.

However, it is also possible, as illustrated in FIG. 4, to design the side gas bag module 10 and in particular the housing 12 such that the first side piece 14 with the flaps 26 in the state fastened to the vehicle faces the interior of the vehicle. Here, the side gas bag module 10 is arranged above a vehicle lining piece 44.

The housing 12 can be produced in one piece by injection molding; however, it is also conceivable to produce the individual components of the housing separately and to then connect them to each other. In the latter case, it is possible to use various materials for the flaps 26 and the side pieces 14, 16, in order for example to achieve a particularly good adhesion or else particularly good sliding characteristics between the flap 26 and the inner face 32 of the second side piece 16.

The side gas bag module according to the invention can be modified to the effect that the second side piece is also provided with flaps.

It is, in addition, conceivable, to also provide the latching connectors 28 on the faces of the side pieces 14, 16. In this case, the ejection channel 38 is preferably closed across the entire length l by one or more flaps 26.

The number of flaps and the dimensions thereof can be adapted to the respective vehicle geometry at the discretion of a person skilled in the art. It is also possible to dispense with latching connectors entirely and to only provide one or more flaps which close the opening of the ejection channel across the entire length l.

What is claimed is:

1. A side gas bag module for a vehicle occupant protection system, said side gas bag module comprising:
   a gas bag; and
   an elongated housing containing said gas bag in a folded condition, said elongate housing having a first side piece and a second side piece, said first side piece being joined to said second side piece by a spine portion, said first side piece having a first edge opposite said spine portion and a first inner face adjacent said gas bag, said second side piece having a second edge opposite said spine portion and a second inner face adjacent said gas bag,
   said first edge of said first side piece defining at least one substantially rigid flap, said flap being pivotally associated with said first side piece by a hinge,
   at least a part of said flap, before an activation of said gas bag module, being arranged inside said elongate housing and adjoining said second inner face of said second side piece.

2. The side gas bag module as set forth in claim 1 wherein said flap lies against said second inner face of said second side piece.

3. The side gas bag module as set forth in claim 1 wherein said hinge is a film hinge.

4. The side gas bag module as set forth in claim 1 wherein said gas bag, in said folded condition, lies against said flap and presses said flap against said second inner face of said second side piece.

5. The side gas bag module as set forth in claim 1 wherein, with an activation of said gas bag module, said flap is moved out from an interior of said elongate housing and remains connected to said first side piece.

6. The side gas bag module as set forth in claim 5 wherein said flap, with an activation of said gas bag module, covers a projecting vehicle contour.

7. The side gas bag module as set forth in claim 5 wherein said flap, with an activation of said gas bag module, determines an unfolding direction of said gas bag.

8. The side gas bag module as set forth in claim 1 wherein a spacing between said first edge and said second edge is less than a spacing between said first side piece and said second side piece proximate to said spine portion.

9. The side gas bag module as set forth in claim 1 wherein at least one latching connection is provided between said first edge and said second edge.

10. The side gas bag module as set forth in claim 1 wherein said elongate housing, viewed a long said spine portion, has a defined length, said flap not extending entirely across said defined length.

11. The side gas bag module as set forth in claim 10 wherein several flaps are provided successively on said first edge of said first side piece remote from said spine portion.

12. The side gas bag module as set forth in claim 1 wherein said first side piece has a closure section, said closure section closing an outlet opening of said elongate housing, said outlet opening being disposed opposite said spine portion, said flap being pivotally connected to said closure section.

13. The side gas bag module as set forth in claim 12 wherein a swivel axis of said flap adjoins said second edge of said second side piece.

14. A side gas bag module for a vehicle occupant protection system, said side gas bag module comprising:

a gas bag;

an elongated housing containing said gas bag in a folded condition, said elongate housing having a first side piece and a second side piece, said first side piece being joined to said second side piece by a spine portion, said first side piece having a first edge opposite said spine portion and a first inner face adjacent said gas bag, said second side piece having a second edge opposite said spine portion and a second inner face adjacent said gas bag; and at least one flap provided on said first edge of said first side piece, said flap being pivotally connected with said first side piece by a hinge, at least a part of said flap, before an activation of said gas bag module, being arranged inside said elongate housing and adjoining said second inner face of said second side piece, said flap having a full surface laying against said second inner face of said second side piece, said full surface being angled towards said first side piece.

15. A side gas bag module for a vehicle occupant protection system, said side gas bag module comprising:

a gas bag inflatable along a side of a vehicle;

an elongated housing for extending along the side of the vehicle, said elongate housing containing said gas bag in a folded condition, said elongate housing having a first side piece and a second side piece, said first side piece being joined to said second side piece by a spine portion, said first side piece having a first edge opposite said spine portion and a first inner face adjacent said gas bag, said second side piece having a second edge opposite said spine portion and a second inner face adjacent said gas bag; and at least one flap provided on said first edge of said first side piece, said flap being pivotally connected with said first side piece by a hinge to enable said flap to pivot relative to said first edge of said first side piece, at least a part of said flap, before an activation of said gas bag module, being arranged inside said elongate housing and adjoining said second inner face of said second side piece.

* * * * *